(12) United States Patent
Buelow et al.

(10) Patent No.: US 7,970,189 B2
(45) Date of Patent: Jun. 28, 2011

(54) METHOD OF AUTOMATIC EXTRACTION OF THE PULMONARY ARTERY TREE FROM 3D MEDICAL IMAGES

(75) Inventors: Thomas Buelow, Grosshansdorf (DE); Rafael Wiemker, Kisdorf (DE); Thomas Blaffert, Hamburg (DE); Cristian Lorenz, Hamburg (DE); Steffen Renisch, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 994 days.

(21) Appl. No.: 11/815,662

(22) PCT Filed: Feb. 6, 2006

(86) PCT No.: PCT/IB2006/050375
§ 371 (c)(1),
(2), (4) Date: Aug. 7, 2007

(87) PCT Pub. No.: WO2006/085254
PCT Pub. Date: Aug. 17, 2006

(65) Prior Publication Data
US 2010/0128940 A1  May 27, 2010

(30) Foreign Application Priority Data
Feb. 11, 2005 (EP) .................................. 05101034

(51) Int. Cl.
*G06K 9/00* (2006.01)
(52) U.S. Cl. ...................................................... 382/128
(58) Field of Classification Search .................. 382/128
See application file for complete search history.

(56) References Cited

U.S. PATENT DOCUMENTS

| | | | |
|---|---|---|---|
| 6,556,696 B1 * | 4/2003 | Summers et al. | 382/128 |
| 7,339,587 B2 * | 3/2008 | Kropfeld | 345/424 |
| 2005/0249393 A1 * | 11/2005 | Kropfeld | 382/131 |
| 2006/0023966 A1 * | 2/2006 | Vining | 382/260 |
| 2007/0053562 A1 * | 3/2007 | Reinhardt et al. | 382/128 |
| 2009/0148008 A1 * | 6/2009 | Wiemker et al. | 382/128 |

OTHER PUBLICATIONS

Tozaki et al., Pulmonary Organs Analysis for Differential Diagnosis Based on Thoracic Thin-section CT Images, IEEE Transactions on Nuclear Science, vol. 45, No. 6, Dec. 1998, pp. 3075-3082.*
Tozaki et al., Extraction and Classification of Pulmondary Organs Based on Thoracic 3D CT Images, Systems and Computers in Japan, vol. 32, No. 9, pp. 42-53, 2001.*

(Continued)

*Primary Examiner* — Bhavesh M Mehta
*Assistant Examiner* — David P Rashid

(57) ABSTRACT

An automated method (1) for the automatic extraction of a pulmonary vessel tree from a 3D medical image, such as multi-slice CT data, is disclosed. A segmented pulmonary vessel is identified as either an artery or a vein by determining a measure for arterialness for the vessel. The measure is based on a relation of the orientation of a local bronchus to the orientation of the segmented pulmonary vessel of the local bronchus. When a vessel is identified as a pulmonary artery, it is added to the pulmonary artery tree. Radii of the pulmonary artery and bronchus are measured automatically and positions where a ratio of these radii exhibits unusual values are presented in a display, preferably for suggesting further assessment by a radiologist, which for instance is useful for pulmonary embolism detection.

20 Claims, 10 Drawing Sheets

OTHER PUBLICATIONS

Bulow et al., A General Framework for Tree Segmentation and Reconstruction from Medical Volume Data, Sprinter-Verlag Berlin Heidelberg, pp. 533-540, 2004.*

De Jong, P.A. et al., "Pulmonary disease assessment in cystic fibrosis: comparison of CT scoring systems and value of bronchial and arterial dimension measurements. Radiology, vol. 231, No. 2, pp. 434-439, May 2004.

Bulow T. et al., "Automatic Extraction of the Pulmonary Artery Tree from Multi-slice CT Data" Proceedings of SPIE, Medical Imaging 2005 vol. 5746, pp. 730-740.

Bulow T. et al., "A General Framework for Tree Segmentation and Reconstruction from Medical Volume Data" Medical Image Computing and Computer Assisted Intervention, vol. 3216, Sep. 26, 2004 pp. 533-540.

Aykac D. et al., "Segmentation and Analysis of the Human Airway Tree from Three-Dimensional X-Ray CT Images" IEEE Transactions on Medical Imaging, vol. 22, No. 8 Aug. 2003.

Schlatholter T. et al., "Simultaneous Segmentation and Tree Reconstruction of the Airways for Virtual Bronchoscopy" Proceedings of SPIE: Medical Imaging 2002, vol. 4684, pp. 103-113.

* cited by examiner

METHOD OF AUTOMATIC EXTRACTION OF THE PULMONARY ARTERY TREE FROM 3D MEDICAL IMAGES

FIELD OF THE INVENTION

This invention pertains in general to the field of medical imaging. More particularly the invention relates to a method of automatic extraction of the pulmonary artery tree from 3D medical images, for instance for pulmonary embolism detection.

BACKGROUND OF THE INVENTION

Multi-detector row computed tomography (MDCT) allows the acquisition of high-resolution data of the entire thorax. The quality of the data allows the assessment of the bronchi as well as the pulmonary artery tree. Extraction of the pulmonary artery tree is an important pre-processing step, e.g., for embolism detection. Also, in the quantitative assessment of the bronchial tree the accompanying artery tree contains important additional information that can be extracted from MDCT data. Hence, for diagnosis and treatment of asthmatic and emphysematic patients, the simultaneous assessment of the tracheobronchial tree and the accompanying pulmonary artery tree is crucial. E.g., the ratio of inner bronchial to accompanying arterial diameter is an important parameter in clinical practice in order to detect and quantify airway narrowing and bronchial dilation.

When extracting the pulmonary vessel tree from Multi-Slice CT data, difficulties arise when distinguishing pulmonary arteries from veins. For instance, seed-point based region expansion methods for the extraction of the pulmonary arteries suffer from leakage into pulmonary veins Hitherto known methods extract all vessels, i.e. the pulmonary arteries and veins, without making any distinction. Furthermore, the segmentations of the tracheobronchial tree and the pulmonary vessel tree are performed separately and thus the relation between the trees is not inherent in the segmentation result. Hence, these methods are not well suited for clinical practice.

De Jong P A et al. (Pulmonary disease assessment in cystic fibrosis: comparison of CT scoring systems and value of bronchial and arterial dimension measurements, Radiology, vol. 231, no. 2, pp. 434-439, May 2004) disclose a method of radius measurements of bronchi and accompanying arteries and the identification of bronchus/artery pairs. However, the disclosed method is performed manually by human observers. Hence, this method is based on a mental act of the individual observer an consequently it is prone to errors. For instance the quality of the identification depends on the experience of the individual performing the extraction, his/her concentration capability at the time of evaluation, etc.

Hence, an object of the present invention is to provide an advantageous automatically performed artery/vein separation in medical 3D images.

SUMMARY OF THE INVENTION

Accordingly, the present invention preferably seeks to mitigate, alleviate or eliminate one or more of the above-identified deficiencies in the art and disadvantages singly or in any combination and solves at least the above mentioned problems by providing a method, a computer-readable medium, and a medical examination apparatus according to the appended patent claims.

The general solution according to the method according to the invention comprises automatically identifying arteries on the basis of accompanying bronchi.

A method for artery/vein separation is based upon the insight that pulmonary arteries run parallel to the bronchi, whereas pulmonary veins—where they come close to the bronchi—tend to cross the airways close to orthogonally. The fact that the pulmonary arteries run parallel to the bronchi is used in order to segment arteries and suppress veins.

Having the bronchial tree and the accompanying arterial tree available these trees may be used for a joint visualization, e.g., in a virtual bronchoscopy application. Bronchial and arterial diameters may be measured fully automatically along both trees during the segmentation. Positions where the ratio of these radii exhibits unusual values, these may be marked in the display and suggested for further assessment by the radiologist.

According to one aspect of the invention, a method of automatic extraction of a pulmonary artery tree from a 3D medical image is provided. The method comprises determining an orientation of a local bronchus, segmenting local pulmonary vessels of the local bronchus into segmented local pulmonary vessels of the local bronchus, determining the orientation of the segmented local pulmonary vessels of the local bronchus, and separating the segmented local pulmonary vessels into pulmonary arteries and veins by determining a measure for arterialness for each segmented local pulmonary vessel.

According to a further aspect of the invention, a computer-readable medium having embodied thereon a computer program for automatic extraction of a pulmonary artery tree from a 3D medical image, for processing by a computer, is provided. The computer program comprises a code segment for determining an orientation of a local bronchus, a code segment segmenting local pulmonary vessels of the local bronchus into segmented local pulmonary vessels of the local bronchus, a code segment determining the orientation of the segmented local pulmonary vessels of the local bronchus, and a code segment separating pulmonary artery and vein of the segmented local pulmonary vessels by determining a measure for arterialness for each segmented local pulmonary vessel.

According to another aspect of the invention, a medical examination apparatus being arranged for implementing the method of the invention, preferably a medical imaging workstation, configured to receive and process a 3D image, is provided. The medical examination apparatus is configured for automatic extraction of a pulmonary artery tree from a 3D medical image, and comprises means for determining an orientation of a local bronchus, means for segmenting local pulmonary vessels of the local bronchus into segmented local pulmonary vessels of the local bronchus, means for determining the orientation of the segmented local pulmonary vessels of the local bronchus, and means for separating pulmonary artery and vein of the segmented local pulmonary vessels by determining a measure for arterialness for each segmented local pulmonary vessel.

The present invention has the advantage over the prior art that it provides advantageously suppression of pulmonary veins from the pulmonary vessel tree, in applications and visualizations modes that merely concern the pulmonary artery tree.

BRIEF DESCRIPTION OF THE DRAWINGS

These and other aspects, features and advantages of which the invention is capable of will be apparent and elucidated from the following description of embodiments of the present invention, reference being made to the accompanying drawings, in which.

DESCRIPTION OF EMBODIMENTS

The following description focuses on an embodiment of the present invention applicable to a Computer Tomography (CT) system and in particular to Multi-Slice CT Data. However, it will be appreciated that the invention is not limited to this application but may be applied to many other imaging systems, including for example Magnetic Resonance Imaging (MRI) systems, 3D Ultrasonic (3D-US) systems, etc.

Below, an automated method for the extraction of the pulmonary artery tree from multi-slice CT data, making use of the tracheobronchial tree, is described. Having the bronchial tree and the accompanying arterial tree available these trees may be used for a joint visualization, e.g., in a virtual bronchoscopy application. Bronchial and arterial diameters are measured fully automatically along both trees. Positions where the ratio of these radii exhibits unusual values may be marked in a display and suggested for further assessment by the radiologist (see e.g. white dots/markings in FIG. 4).

Figure 1:
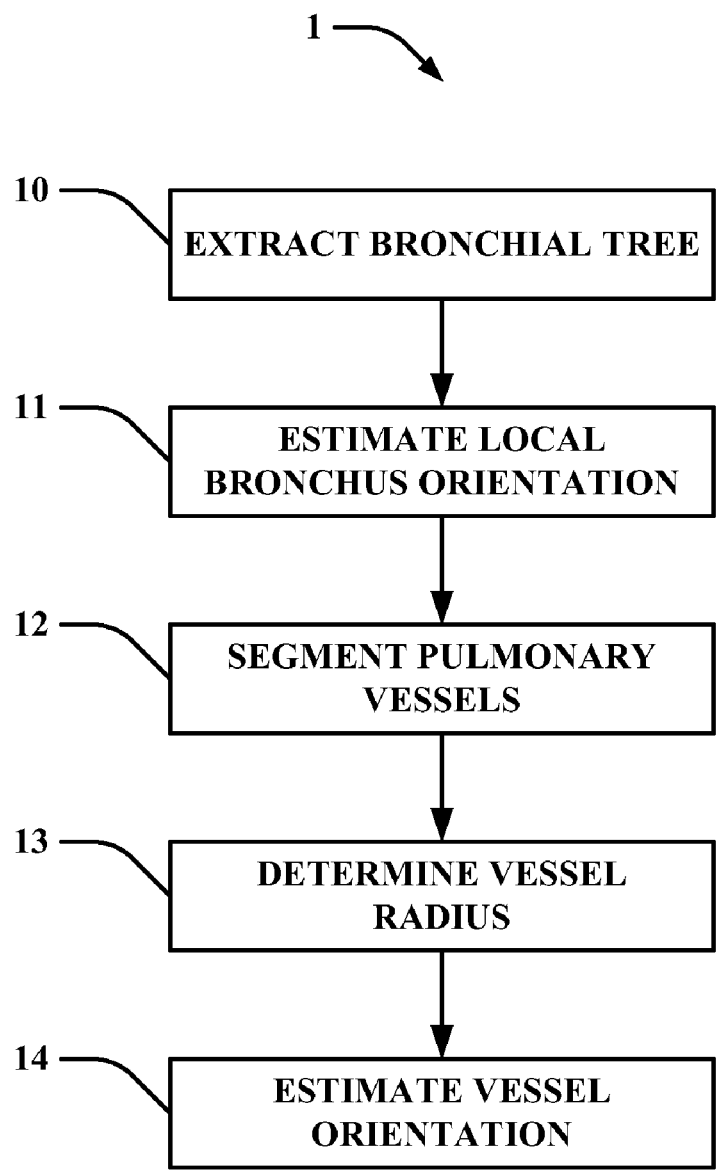
FIG. 1 is a schematic flowchart illustrating an embodiment of the method according to the invention.
Figure 2A:
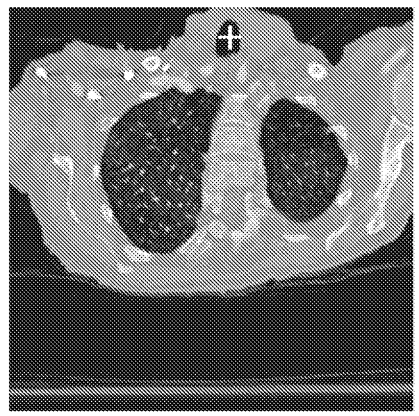
FIGS. 2A-2C are exemplary CT slice images illustrating results of a trachea-seed finding procedure, wherein axial slices (512×512) through the thorax are displayed, and a white cross marks the estimated trachea position.
Figure 2B:
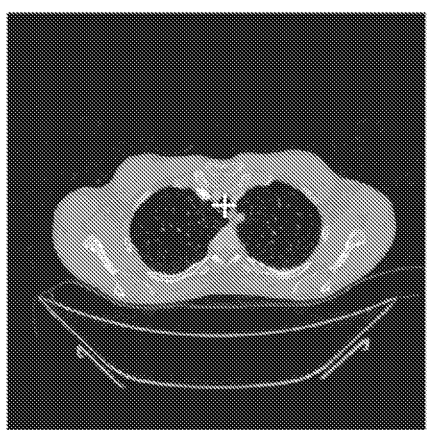
Figure 2C:
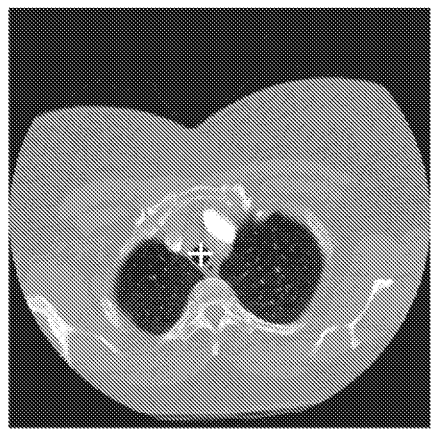

In a first embodiment 1 of the method of the invention, with reference to FIG. 1, the following procedure is performed.

Firstly, the bronchial tree is extracted using a suitable algorithm in step 10, as for instance based on the algorithm described in Schlathölter et al. (Simultaneous Segmentation and Tree Reconstruction of the Airways for Virtual Bronchoscopy, SPIE Conference on Medical Imaging, Proceedings of SPIE Vol. 4684, pp. 103-113 (2002).

Subsequently, i.e. when the bronchial tree segmentation is available from step 10, the local bronchus orientation is estimated in step 11. This may for instance be done based on the bronchus centerline orientation, or alternatively for instance by using a local gray-value based measure, which is to be specified below.

Then, a seed-point based segmentation of the pulmonary vessels is performed in step 12, during which the orientation of these pulmonary vessels is locally estimated. This is described in more detail below.

For each in step 12 extracted vessel segment, a measure is evaluated that is based on the absolute value of the dot product of the orientation vectors of the vessel segment and the nearest bronchus. This measure has high values for vessels running close and parallel to a bronchus. The measure enables taking a decision whether the currently considered vessel is a pulmonary artery or vein, i.e. it is interpreted as a measure of the "arterialness" of the vessel segment. The value of the measure is used to decide whether the vessel segment is included into the arterial tree or not. This may be done by comparison with a threshold. Preferably, the threshold is determined empirically. An alternative way comprises the integration of the arterialness values over whole branches including parent and child segments of a given segment.

When the vessel in step 12 is identified to belong to the arterial pulmonary tree, the radius of the vessel is determined in step 13. The local orientation measure mentioned above works as follows: Given a vessel centerline point, the mean radial derivative of the image data is computed on a sphere centered at the centerline point. Large negative derivatives are obtained due to rapid gray-value changes when the sphere touches the vessel boundary. The radius of the sphere is varied over a predefined range, wherein the radius at which the mean derivative is minimal is taken as an estimate for the vessel radius.

Then, the vessel orientation is estimated in step 14 from the radial derivative values on the sphere of optimal radius. For each given pair of antipodal points on the sphere the sum of the absolute radial derivatives is computed. The pair for which this sum takes a minimum is assumed to represent the vessel orientation, assuming that gray-value changes will be minimal along the vessel direction. The vector connecting this pair of antipodal points is taken as orientation estimate.

The same procedure may also be used for the bronchi, considering that the gray-value profile is inverted in this case and, in the radius estimation, a maximum of the mean radial derivative is searched rather than a minimum.

Having the bronchial tree and the accompanying arterial tree available these trees may be used for a joint visualization, e.g., in a virtual bronchoscopy application. Bronchial and arterial diameters are measured fully automatically along both trees according to the method and during the segmentation described above. Positions where the ratio of these radii exhibits unusual values may be marked on a display and suggested for further assessment or diagnosis by a radiologist.

A further embodiment 130 of the method of the invention is illustrated in FIGS. 2 to 10 and 13. In the previous embodiment a presegmented bronchial tree is assumed. When classifying vessels into arteries and veins, the centerline points of the existing bronchial tree are used as candidate points. In the following embodiment an alternative approach is used. Here, when investigating a vessel, we look for bronchi candidate points based on the gray-value distribution in the neighborhood. This method may yield better results under certain conditions, since the bronchial tree extraction might miss branches, so that a whole subtree of the bronchial tree is missing, whereby the corresponding arterial sub tree would erroneously be mislabeled as "vein". This is avoided in the embodiment described in more detail below, by measuring the vessel and bronchus orientations in a more robust way.

This method, like the previous one, for artery/vein separation is based upon the fact that the pulmonary artery tree accompanies the bronchial tree. For each extracted vessel segment, a measure of "arterialness" is evaluated. This present measure combines two components: a method for identifying candidate positions for a bronchus running in the vicinity of a given vessel on the one hand and a co-orientation measure for the vessel segment and bronchus candidates. The latter component rewards vessels running parallel to a nearby bronchus. The spatial orientation of vessel segments and bronchi is estimated by applying the structure tensor to the local gray-value neighborhood.

In experiments performed for carrying out the method multi slice CT datasets of the lung were used, which were acquired by Philips IDT 16-slice, and Philips Brilliance 40-slice scanners. As a result of the experiments, it was shown that the measure reduces the number of pulmonary veins falsely included into the arterial tree.

The present method provides an automated way of extracting the pulmonary vessel tree from multi-slice computed tomography (MSCT) datasets and furthermore to provide a way to distinguish pulmonary arteries from veins.

The tree segmentation method starts from one or more seed positions. From these positions a front propagation process is started. It turns out that even if the seed points are placed in pulmonary arteries it is likely that also venous subtrees will be included in the segmentation. This is due to numerous crossings of arteries and veins which appear at a similar Hounsfield value and exhibit no separation between the vessels in the data sets. These artery/vein crossings can easily be mistaken for branching points of the arterial tree.

The present method for distinguishing pulmonary arteries from pulmonary veins is based on the fact that the arterial tree is accompanying the airways tree. After segmentation of the vessel tree each vessel segment—in our terminology: a portion of the vessel tree, starting at one branching point and terminating at the (distally) next branching point—is checked for a bronchus in its neighborhood. In case a bronchus is found, the orientations of the vessel and the bronchus are compared. The closer to parallel the structures are, the higher is the "arterialness" value that is assigned to this vessel portion.

Figure 3A:
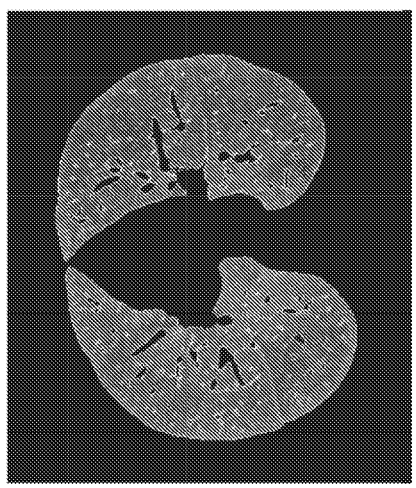
FIGS. 3A-3E are exemplary CT slice images illustrating a lung segmentation method.
Figure 3B:
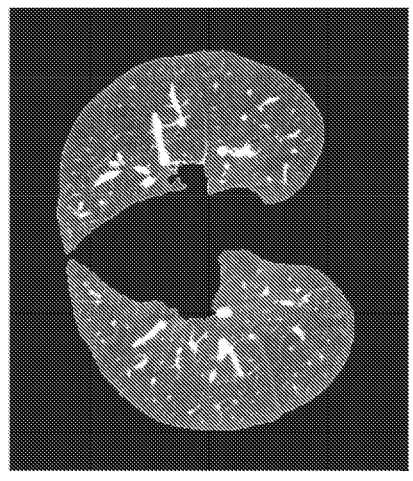
Figure 3C:
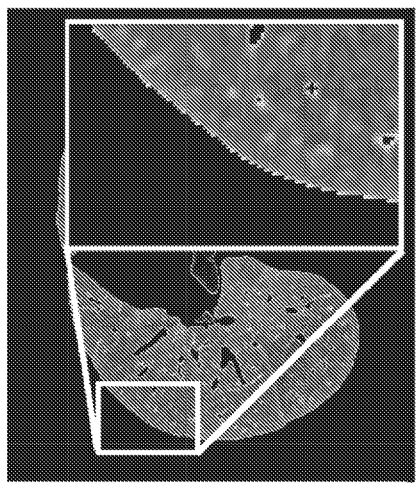
Figure 3D:
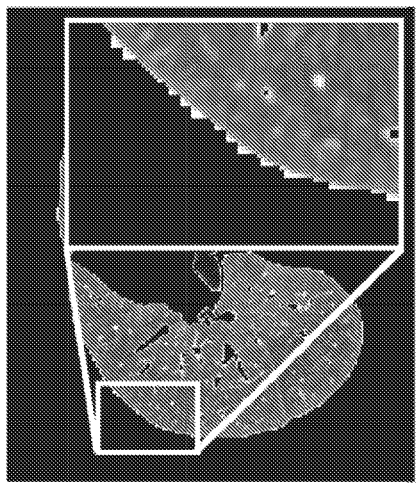
Figure 3E:
Figure 3F:
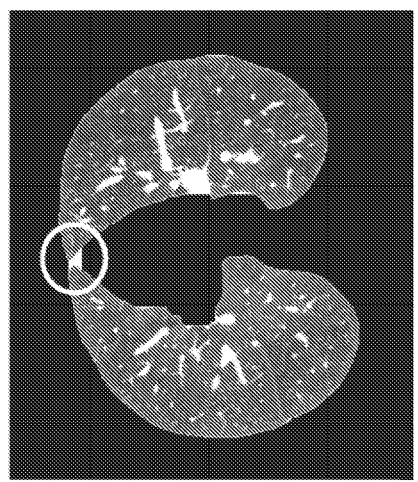
FIGS. 3F and 4 are CT images illustrating the result of the method illustrated by means of FIGS. 3A-3E.
Figure 4:
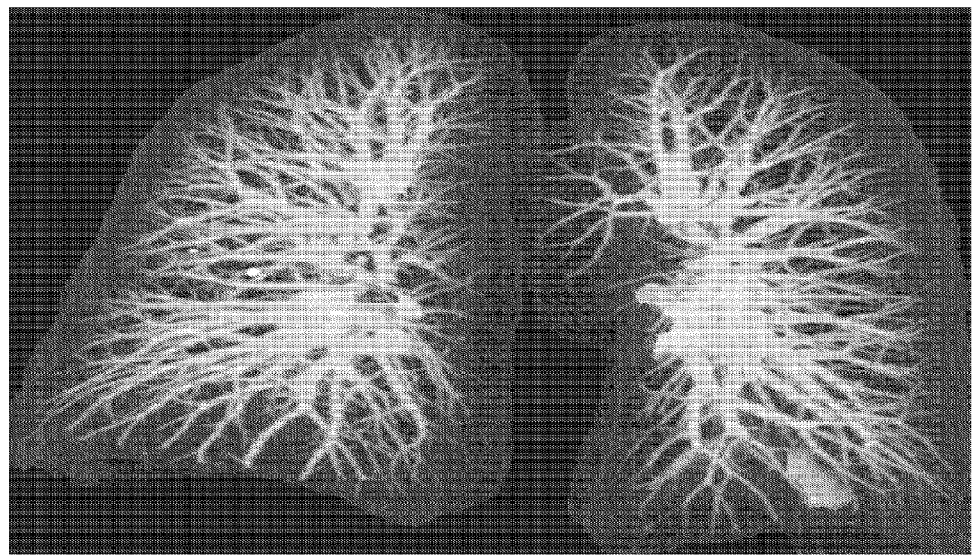

In the following section the vessel tree segmentation method is described. More specifically, the lung segmentation is illustrated by FIGS. 3A to 3F and FIG. 4, wherein FIGS. 3A-3F show the different steps of the lung segmentation at the example of one axial slice. FIGS. 3A and 3B show upsampled results of region growing applied to a subsampled dataset, wherein FIG. 3A shows the Upsampling to the complete 3×3×3 block, and FIG. 3B shows the upsampling according to a HU threshold. FIG. 3C illustrates the segmentation after removal of big airways. FIG. 3D illustrates the segmentation after closing gaps in order to include pulmonary vessels, wherein closing is applied to the whole lung mask. Note, that a "bridge" appears, connecting the left and right lung at the anterior part of the lung, see the circled area in FIG. 3D. FIG. 3E illustrates the result when the closing operation is applied to the left and the right lung separately and the unwanted bridging effect is avoided. FIG. 3F gives the final segmentation result and FIG. 4 is a maximum intensity projection of that final result.

This segmentation will now described in more detail.

Before the actual vessel tree extraction takes place the lung is segmented from the dataset in a preprocessing step. This reduces the search space for the vessel tree segmentation. Initially the trachea is detected automatically. For this purpose a technique for the detection of the descending aorta in MSCT datasets is used. Work is performed on a subsampled version of a dataset. A subsampling rate of 5 in x-, y-, and z-direction is used. A preferred threshold of −600 HU is applied and "black areas" (Hounsfield-value←600 HU) are detected that have an extent in x-direction between 10 and 30 mm and an extent in y-direction between 10 and 50 mm. The candidate points obtained in this way are clustered and the centroid of the point cluster with most expressed orientation in z-direction is chosen as most likely trachea-seed candidate. See FIGS. 2A to 2C for results. The procedure found the trachea, indicated by the cross in the FIGS. 2A to 2C, correctly in all of the data-sets tested so far.

Intermediate results of the lung segmentation procedure to be described in the following are shown in FIGS. 3A to 3F and FIG. 4. Starting at a trachea-seed point a simple region growing process is started including all connected voxels below a given Hounsfield threshold of −600 HU. The region growing is performed on a subsampled dataset, where the subsampling rate is 3 in all directions. The result of the region expansion is propagated to the full dataset by mapping each included voxel to the corresponding 3×3×3 block. Since including the whole 3×3×3 block corresponding to a segmented voxel will lead to the inclusion of unwanted bright voxels, see FIG. 3A, the same threshold used for the region growing is applied in the up-sampling step, such that within a given block only voxels below −600 HU are included, see FIG. 3B. Before the vessels are included into the lung-segmentation reached so far, the trachea and main bronchi need to be excluded in order to avoid filling in the space between the lung and the trachea along with the vessels. The trachea is segmented using the same region growing procedure and seed point as above. This time a preferred threshold of −900 HU is used. The trachea mask is dilated by 3 mm, and then subtracted from the lung mask, see FIG. 3C. The dilation is performed via the fast marching algorithm growing outward with the surface of the trachea mask being used as the initial front. Here, a 2D slice-based procedure is used for trachea segmentation.

In a next step the vessels, that are not included in the lung mask extracted so far, are filled in. This is done by a line based procedure. Rows are picked from the lung mask and searched for gaps. Gaps which length is shorter than a predefined maximal length are closed. According to an implementation first all y-direction lines are processed with the maximal length being dy=15 mm, followed by the x-lined with dx=15 mm Finally, the z-lines are processed with dz=5 mm If the whole lung mask was processed in this way, one would risk including a bridge between the left and right lung, see FIG. 3D. In order to avoid this, the left and right lung wings are processed separately, see FIG. 3E. The final result shown in FIG. 3F and FIG. 4 is obtained by removing bright areas at the surface of the mask that were included during the vessel filling step.

The methodology used for the local vessel/bronchus orientation measurement is explained in the next section.

The procedure consists of three levels—the voxel level, the segment level, and the tree level.

Voxel level: Starting from an initial seed point a fast marching front propagation process is started. A voxel acceptance criterion decides whether a voxel is touched or not. This can, e.g., be a HU threshold criterion. The propagating front is checked for connectedness in regular intervals. If the front falls apart into two or more disconnected components, this is interpreted as a bifurcation in the tree. In this case the segment currently grown is finished and one new segment per connected front component is initialized. In order to maintain nicely shaped, mostly flat front portions, the front propagation velocity is kept constant v≡1.

Segment level: During segment expansion, it is checked by a termination criterion whether expansion of the current segment should be continued or terminated. Typical termination causes are disintegration of the front or the reaching of a maximally allowed segment length. A segment evaluation criterion regularly evaluates and has the possibility to reject a segment. For an accepted segment a new segment is initialized for each connected front component. Rejected segments on the other hand do not initialize children. Segment evaluation criteria comprise criteria of geometric nature, such as maximum segment radius, elongated shape, etc, or gray-value based criteria, such as vesselness, orientedness, etc. Segments that turn out unacceptable can be regrown using an automatically adapted set of parameters for the various criteria. These parameters are also adapted whenever a new segment is inherited from a parent segment.

Tree level: At this level decisions that cannot be made looking at a single segment are made. E.g., a subtree can be pruned if the density of branching points gets too high, indicating leakage.

Along with the segmentation, the tree structure including the branching points and the vessel centerlines are built up. Centerline points are estimated as centers of gravity of the propagating front components. The described process is sketched in FIGS. 5 and 6.

Figure 5:
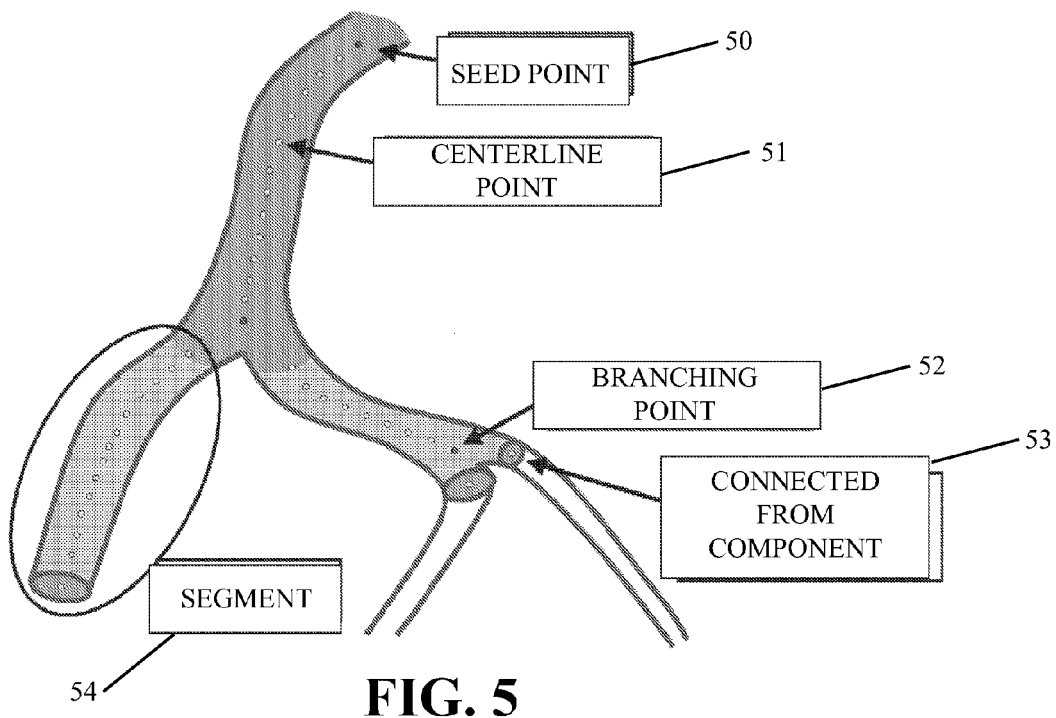
FIG. 5 is a schematic sketch illustrating the tree segmentation algorithm.

In FIG. 5 the principle of tree segmentation is illustrated by:

| | |
|---|---|
| Seed point | 50 |
| Centerline point | 51 |
| Branching point | 52 |
| Connected front component | 53 |
| Segment | 54 |

Figure 6:
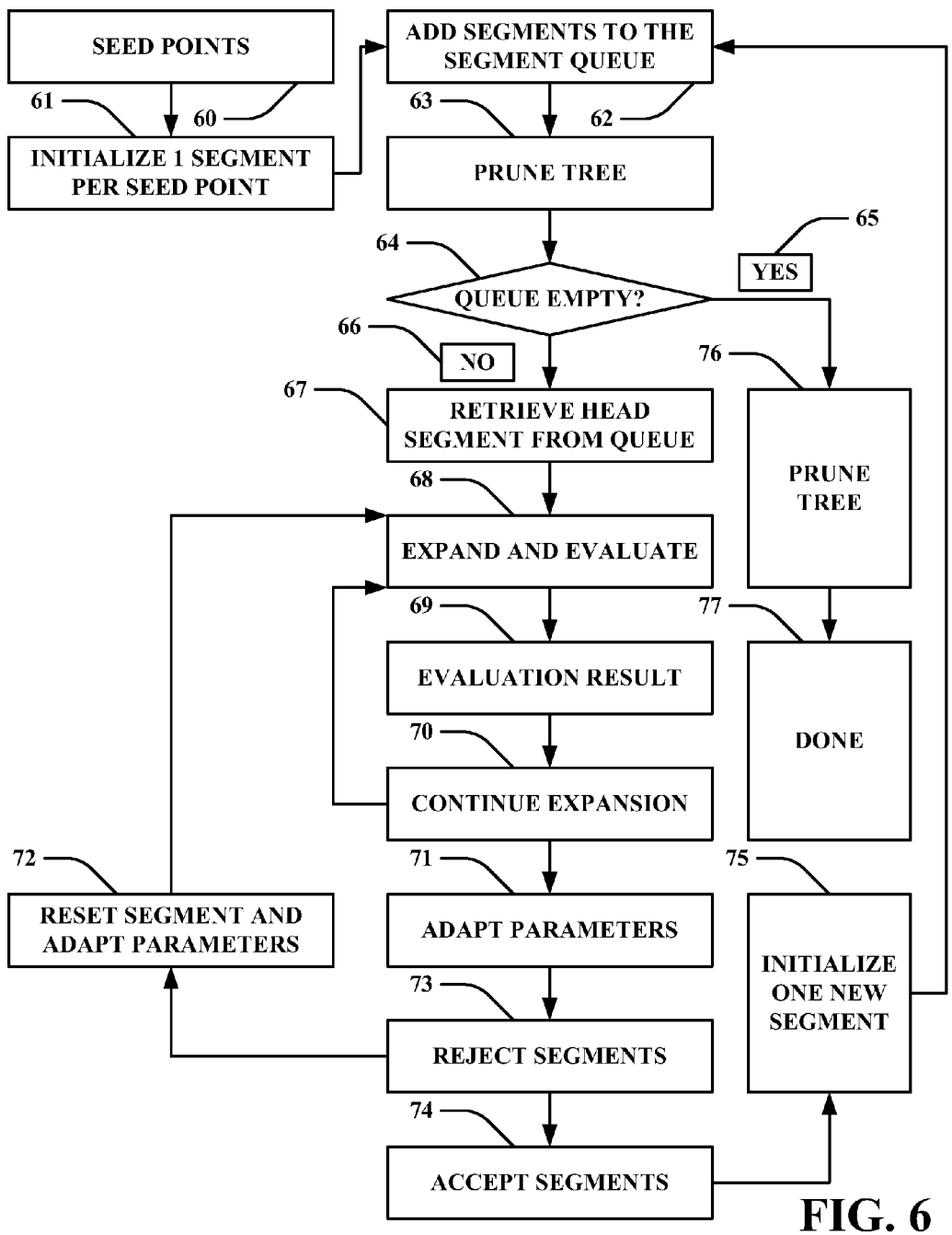
FIG. 6 is a flow chart of the tree segmentation algorithm.

In FIG. 6 the following method for building the tree structure is illustrated by:

| | |
|---|---|
| Seed points | 60 |
| Initialize one segment per seed point | 61 |
| Add segments to the segment queue | 62 |
| Prune tree | 63 |
| Queue empty? | 64 |
| Yes | 65 |
| No | 66 |
| Retrieve head segment from the queue | 67 |
| Expand and continuously evaluate | 68 |
| Evaluation result: | 69 |
| Continue expansion | 70 |
| Adapt parameters | 71 |
| Reset segment and adapt expansion parameters | 72 |
| Reject segments | 73 |
| Accept segment | 74 |
| Initialize one new segment per connected front component | 75 |
| Prune tree | 76 |
| Done | 77 |

Figure 7A:
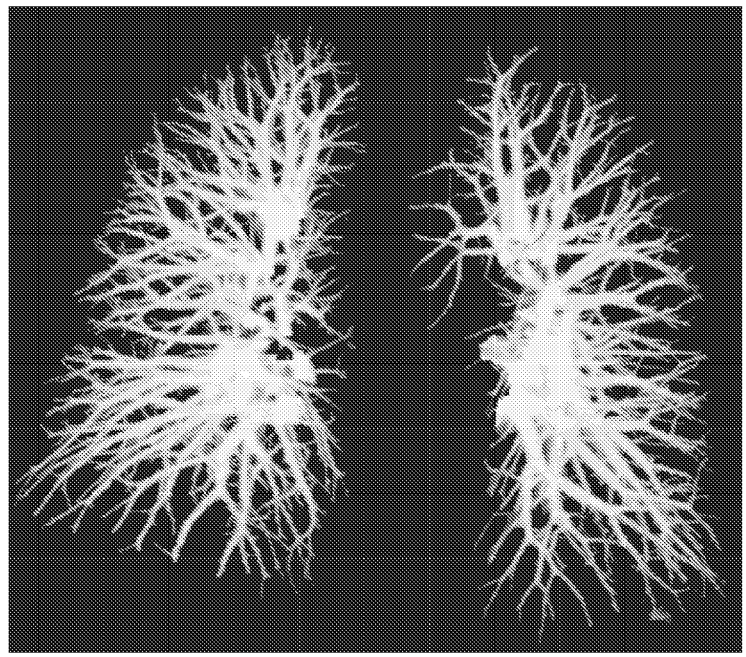
FIG. 7A is an maximum intensity projection (MIP) of an extracted vessel tree.
Figure 7B:
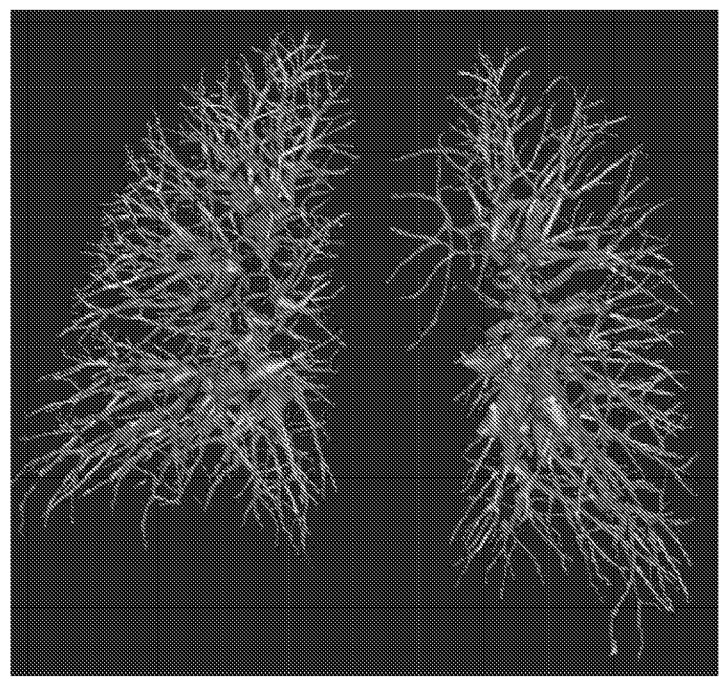
FIG. 7B is a illustration of rendering of the extracted vessel tree based on the centerline information, including radii, alone.
Figure 8:
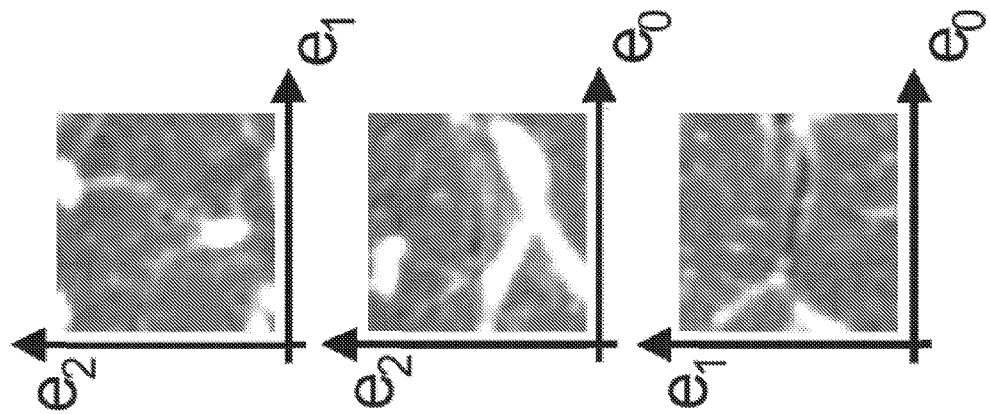
FIG. 8 is a illustration that shows orthogonal cross-sections through a pulmonary vessel.
Figure 8:
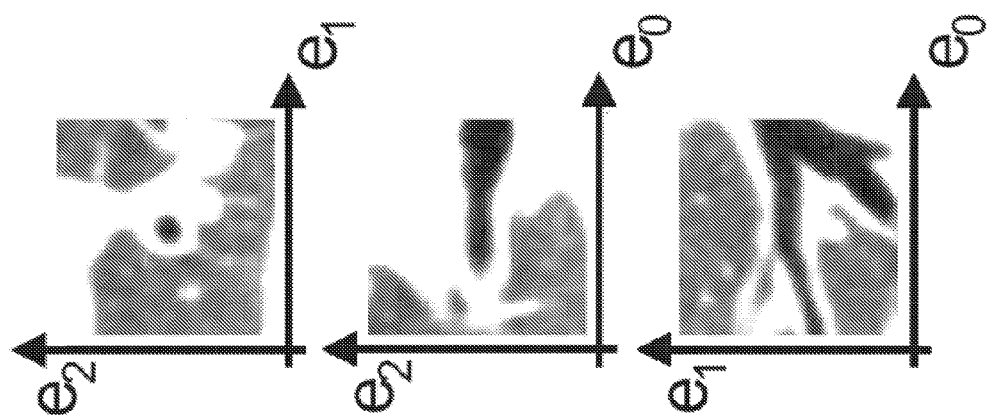
Figure 8:
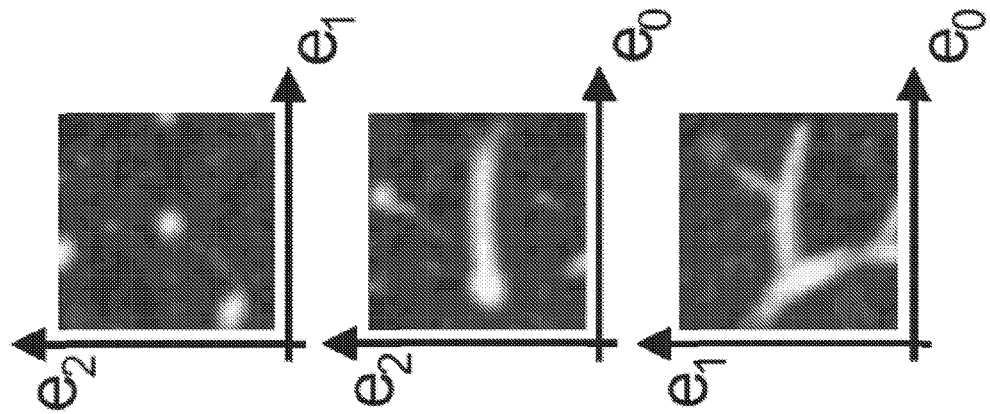

In the present exemplary embodiment, at the voxel level all voxels with a Hounsfield value of or above −600 HU are accepted. Growth is terminated at branching points, i.e., if the propagating wave-front gets disconnected. At the segment level, segments are checked for their radius. If the radius exceeds a maximally allowed value, the segment is rejected. The maximal possible radius $r_{max}$ of a segment is determined by the actual radius of its parent segment $r_{parent}$ as $r_{max}=2r_{parent}$. At the tree level, terminating segments of length less than 5 mm are pruned. The result of the tree segmentation is shown in FIGS. 7A and 7B. The result of the segmentation consists of a set of voxels on the one hand and a centerline tree containing branching and parent-child information as well as vessel radius estimates for each centerline point.

Orientation estimation: In order to compute the measure of arterialness as mentioned above, in step 135, the local vessel- and bronchus-orientation are determined, as well as the orientedness, in steps 131-134. see FIG. 13. The latter is a measure of how distinct the linear orientation of the local gray-value structure is. We make use of the structure tensor to obtain estimates of these values.

The structure tensor J is defined as $$J = \begin{bmatrix} \langle g_x g_x \rangle & \langle g_x g_y \rangle & \langle g_x g_z \rangle \\ \langle g_y g_x \rangle & \langle g_y g_y \rangle & \langle g_y g_z \rangle \\ \langle g_z g_x \rangle & \langle g_z g_y \rangle & \langle g_z g_z \rangle \end{bmatrix} \quad (1)$$

Here, $g_x$, $g_y$, and $g_z$ are the components of the 3D image gradient vector.

$$(g_x, g_y, g_z)^\top := \Delta I \quad (2)$$

The brackets <•> in (1) indicate a weighted averaging using a weighting function w. In our experiments we use a Gaussian weighting function $$\langle g_p g_q \rangle(x) := \int_{\mathbb{R}} w(x-x') g_p(x') g_q(x') dx' \quad (3)$$

Let $e_0$, $e_1$, and $e_2$ be the eigen vectors of the structure tensor J sorted such that the corresponding eigen values are in ascending order $\lambda_0 < \lambda_1 < \lambda_2$. Thus, $e_0$ corresponds to the orientation with the smallest absolute directional derivative, while $e_2$ corresponds to the orientation with the largest variation. If computed inside a vessel or a bronchus the smallest gray-value variation is detected along the tubular structure and consequently use $e_0$ as local orientation estimate.

Within the tubular structure, i.e. within either the vessel or bronchus, one orientation with low gray-value variation and two orthogonal orientations with larger variation is detected. The normalized difference of the largest and the smallest eigen value $$S := \frac{\lambda_2 - \lambda_0}{\lambda_2 + \lambda_0} \in [0, 1] \quad (4)$$

is a measure for the structuredness of the local gray-value neighborhood. In a planar gray-value structure two small, and ideally zero, eigen values are expected. Thus, the normalized ratio of the largest and the second largest eigen value $$P := \frac{\lambda_2 - \lambda_1}{\lambda_2 + \lambda_1} \in [0, 1] \quad (5)$$

indicates the planeness of the gray-value structure. Note, that $S \geq P$. The difference $$O := S - P \in [0, 1] \quad (6)$$

is used as a measure for the linear orientedness of the local gray-value structure. Examples for orientation estimation results and the corresponding orientedness values are given in FIG. 8, wherein orthogonal cross-sections through a pulmonary vessel (a) and two bronchi ((b) and (c)) are shown, which are oriented according to the eigen vectors $e_0$, $e_1$, and $e_2$ of the structure tensor, as explained above. The orientedness values for the illustrated examples are (a) 0.91, (b) 0.87, and (c) 0.51.

The "arterialness" measure will now be outlined.

In order to distinguish arteries from veins a measure of arterialness is determined. According to this embodiment of the method according to the invention, this measure of arterialness gives for each sample point along the vessel centerlines a value, exemplary between 0 and 1. A value of 0 indicates that the centerline point most likely is part of a vein, while 1 expresses the highest likelihood that the point looked at is part of an artery. The main step in the estimation of the arterialness of a vessel centerline point is the search for candidate positions of a bronchus assumed to accompany an artery.

Figure 9:
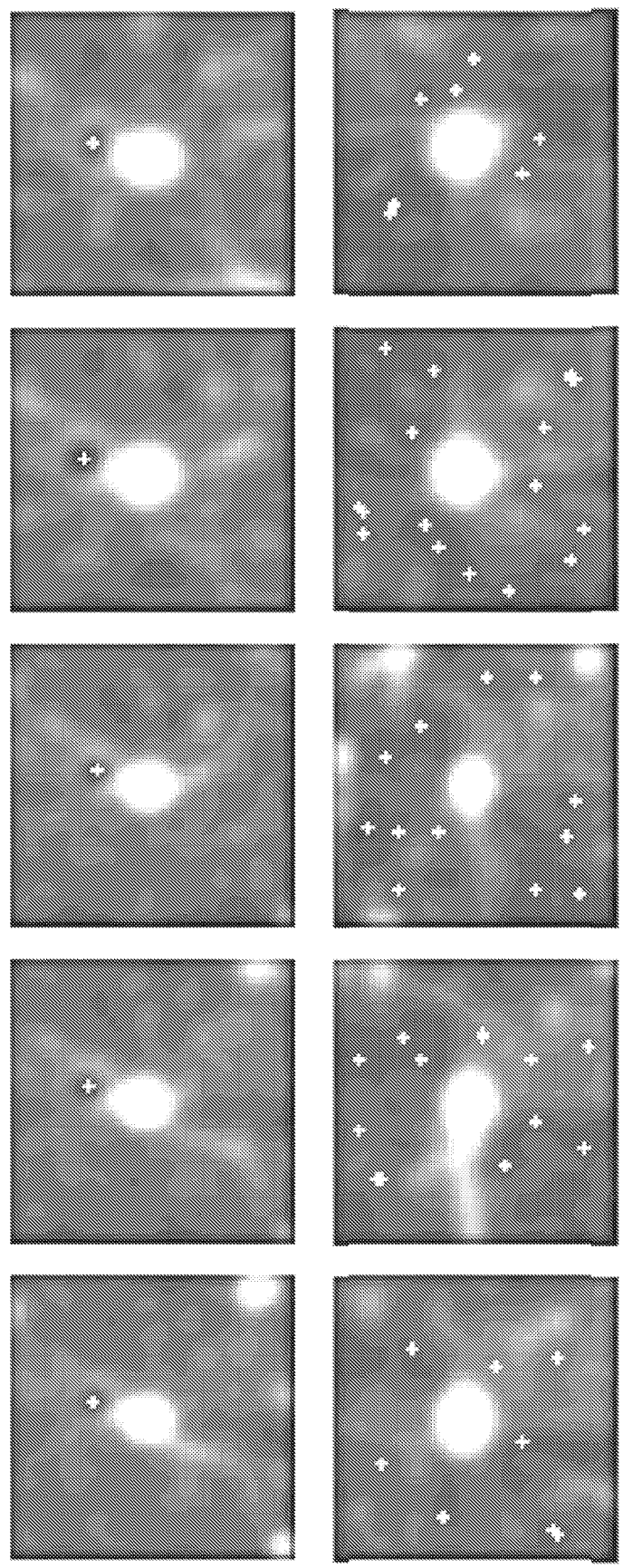
FIG. 9 are sections from CT slices showing cross sections through two vessels.

Detection of Homologous Bronchi Candidates: For any given vessel centerline point we start by estimating the vessel orientation as described above, as an initial candidate set. Let $r_{ves}$ be the local vessel radius at the centerline point. We use $\sigma = r_{ves}/2$ for the Gaussian weighting function in (3). The plane normal to the vessel-orientation is tri-linearly resampled. A 2D square image I, consisting of exemplary 64×64 pixels covering an area of $8r_{ves} \times 8r_{ves}$ is extracted with the vessel centerline point at its center. The 2D cross sections are smoothed by a Gaussian filter with $\sigma = r_{ves}/4$. Some examples are shown in FIG. 9, which shows cross sections through two different exemplary vessels. Five cross sections are shown in 1 mm steps along each of the two exemplary vessels. The bronchi candidates of the reduced candidate set are marked by white crosses. The upper row of FIG. 9 shows an artery of radius 3 mm. It should be noted that the candidate set contains no false members in this case. As can be seen, the homologuous bronchus has correctly been identified. The estimated arterialness for this segment is 0.98. The lower row of FIG. 9 shows a vein of radius 3 mm. It should be noted that there is a large number of candidate points for each of the slices. This is due to the fact that there is no bronchus with a high Hessian value present that could serve as an "outlier" in the reduction step leading from the initial to the reduced outlier set. The arterialness for this segment is 0.28.

All local gray-value minima positions $p_i$ within the smoothed cross section image I are considered possible bronchi candidate points and constitute the initial candidate set.

Now, a reduced candidate set is considered. In the following local minima are excluded and the initial candidated set is reduced. For each candidate point the determinant of the Hessian matrix $$H_i := \det \begin{bmatrix} \partial_{xx} I & \partial_{yx} I \\ \partial_{xy} I & \partial_{yy} I \end{bmatrix}(p_i) \qquad (7)$$

is computed. This value is larger for a real bronchus candidate than, e.g., for an erroneous shallow local minimum. Let $$H_{max} := \left(\max_j H_j\right);$$

be the maximal Hessian value among all initial bronchus candidates for a given vessel centerline point. All candidate points pi with $H_i < H_{max}/2$ are now removed from the initial candidate set. Furthermore all candidate points pi for which $I(p_i) > -800$ HU are discarded. The remaining candidates constitute the reduced candidate set.

The Arterialness Measure

The reduced candidate set is used in order to estimate the arterialness of the vessel at a given centerline point. First of all, it should be noted that the presence of many points in the reduced candidate set makes it highly probable that we are looking at a vein rather than an artery. The reason for this is that in case of an artery, the Hessian value $H_i$ for a correct bronchus is typically much larger than for other local minima. Thus, the correct candidate serves as an outlier in distribution of the Hessian value. For instance, if all values below half of the maximal value are discarded, this effects most false candidates. Thus, in case of an artery most false candidates are discarded when going from the initial to the reduced candidate set. On the other hand, in case of a vein there is no such outlier and many local minima will be present as candidates even in the reduced candidate set. For this reason, in order to not get a large arterialness value from one of many present candidate points, the arterialness is assigned a value of 0 to a centerline point if the cardinality, i.e. the number of points in the set, of the reduced candidate set is larger than a certain number. In the experiments an exemplary value of 5 was chosen.

Otherwise, for the candidates $p_i$ in the reduced candidate set the coorientation $C_i$ between the vessel and the suspected bronchus is evaluated:

$$C_i = \begin{cases} |e_{p_i} \cdot e_{vessel}|^2 & \text{if } O_i > O_{min} \\ 0 & \text{else.} \end{cases} \qquad (8)$$

The orientation $e_{p_i}$ and the orientedness $O_i$ at the candidate point $p_i$ are estimated by the structure tensor with $\sigma = r_{ves}/4$ for the Gaussian weighting function used in the computation of the structure tensor. If the orientedness $O_i$ at a candidate position $p_i$ is smaller than a minimal orientedness $O_{min}$, the orientation estimate is too unreliable and the presence of a bronchus is unlikely, so that the arterialness is set to zero in this case. In the exemplary implementation $O_{min}$ was set to 0.2.

The arterialness of a centerline point is defined as $$\max_i C_i$$

The arterialness of a segment, i.e. a portion of a vessel between two branching points, is defined as the mean arterialness values of the top 50% of the centerline points. Excluding 50% of the points ensures robustness against unreliable values, e.g., close to the branching points.

The presented method 130 has been applied to several MSCT datasets (Philips Brilliance 40 slice). For the evaluation of the method, the large vessels leaving and entering the heart were excluded from analysis, since in these parts arteries and veins tend to run in direct vicinity to each other and have crossings that do not allow to segment them as separate vessels using a gray value based approach. The analysis was applied to vessels of radius 7 mm and smaller. Between the radii of 3 mm and 7 mm arteries were reliably identified. In this range of radii arteries receive very high arterialness ratings. Vessels were classified as arteries by comparison with a threshold value, here if the arterialness was 0.8 or larger. Otherwise the vessel were considered being veins.

Figure 10:
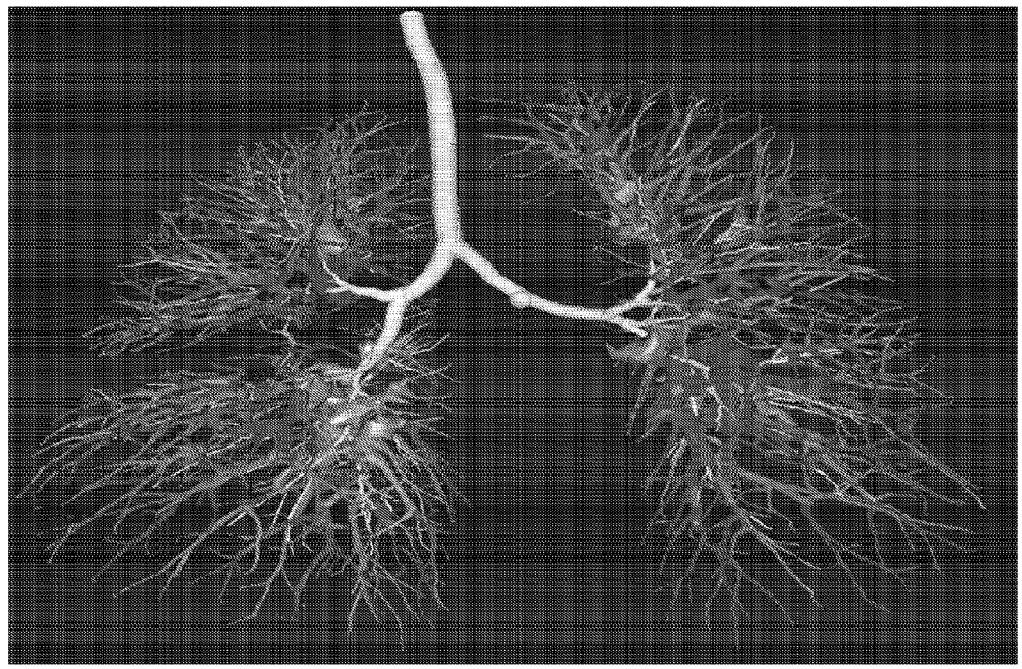
FIG. 10 is a 3D image illustrating the segmented and labelled pulmonary vessel tree overlaid with the airways tree.
Figure 13:
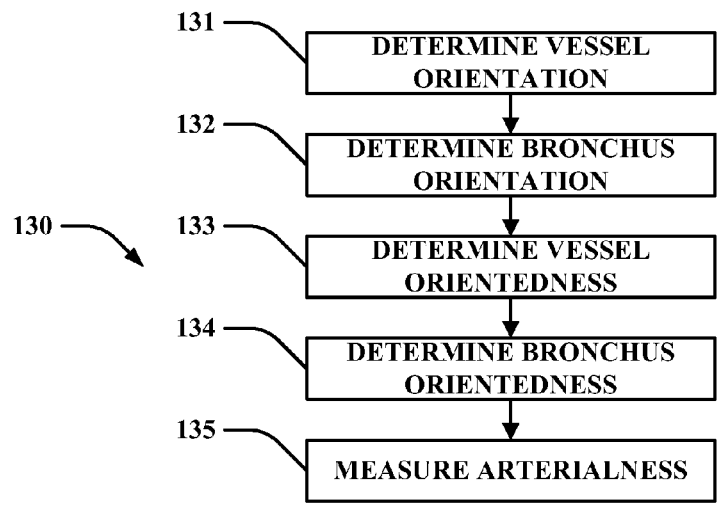
FIG. 13 is a schematic flowchart illustrating another embodiment of the method according to the invention.

The risk of mislabeling smaller arterial branches as veins increases with decreasing vessel radius. The reason for this is the fact that small vessels as bright tubular structures are better visible than bronchi of similar size. The walls of small bronchi are subject to partial voluming which limits their detectability. Furthermore the bronchi radii are even smaller than the radii of the accompanying arteries. For this reason the application of the arterialness measure was limited to vessels of at least 3 mm radius. According to the experience gained from the experiments, the branching structure below this vessel size is unlikely to contain misleading artery-vein crossings. Thus, unlabeled sub-trees of labelled vessel segments received the same label as their parent segments. The effect that vessels are visible down to more distal parts then bronchi is illustrated in FIG. 10, where a segmentation result of the vessel tree is overlaid with a segmentation of the airway tree, using a method similar to the one presented by Schlatholter et al., cited above. The rendering on which the image of FIG. 10 is based on the centerline tree information with a radius value for each centerline point. FIG. 10 shows the tracheobronchial tree together with the vessels classified into pulmonary arteries and veins.

All arteries accompanying bronchi that were correctly found by the used airways segmentation method have been labelled correctly.

To sum it up, the present embodiment of the method according to the invention was described. A method for the extraction of the pulmonary vessel tree from MSCT datasets as well as way to assign arterialness values to all vessel segments of the segmentation result was described. These arterialness values can most reliably be estimated for vessel within a certain range of radii. Among the segments with a very large vessel radius are many which do not correspond to real anatomic vessel portions but rather to two or more vessel running close to each other or crossing each other. For very small vessels the homologous bronchi are not visible at the given resolution. Since the presented method relies on bronchus visibility these small vessels are excluded from the direct analysis. In an intermediate range of vessel radii, the presented measure works robustly. Since in the finer portions of the vessel subtrees vessel crossings are less likely, artery/vein labels are propagated from the intermediate vessels to the distal subtrees.

In experiment the presented method identifies most arteries correctly. The method presents a useful step in usage of the bronchial tree for artery/vein separation.

Figure 11:
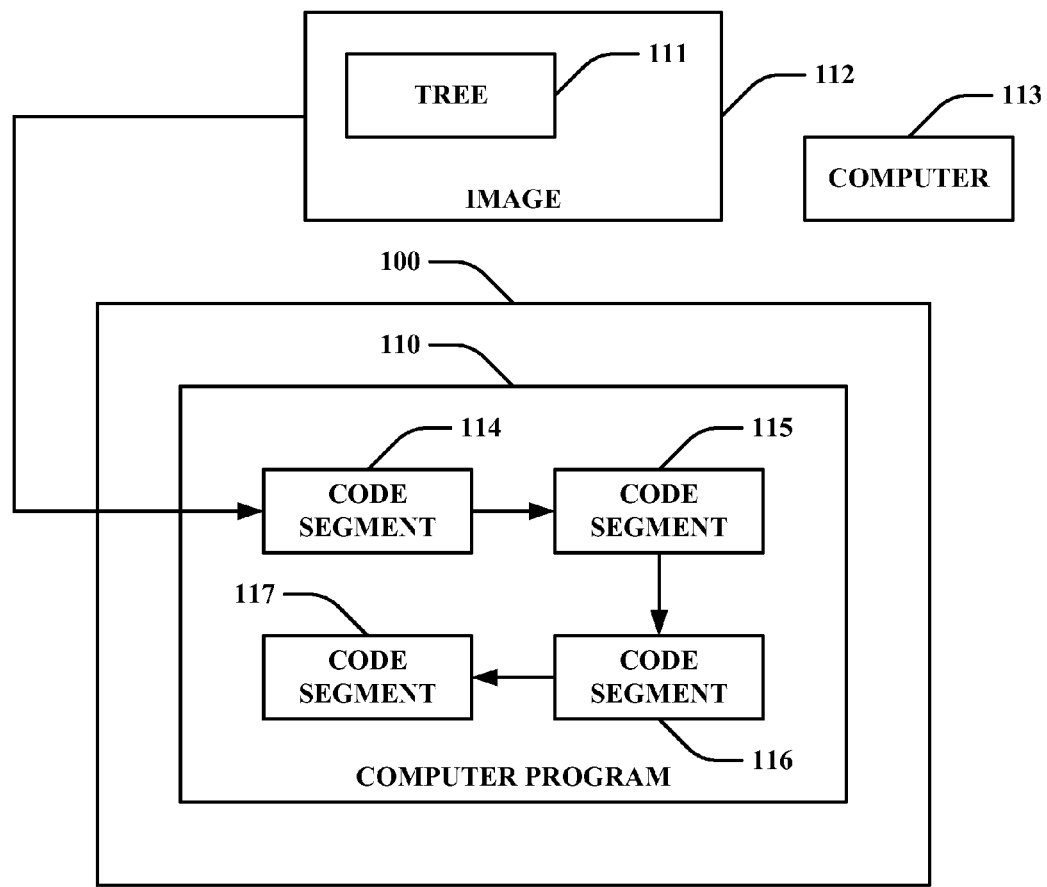
FIG. 11 is a schematic illustration of an embodiment of the computer readable medium of the invention.

In another embodiment of the invention according to FIG. 11, a computer readable medium is illustrated schematically. A computer-readable medium 100 has embodied thereon a computer program 110 for automatic extraction of a pulmonary artery tree 111 from a 3D medical image 112, for processing by a computer 113. The computer program comprises a code segment 114 for determining an orientation of a local bronchus, a code segment 115 for segmenting local pulmonary vessels of the local bronchus into segmented local pulmonary vessels of the local bronchus, a code segment 116 for determining the orientation of the segmented local pulmonary vessels of the local bronchus, and a code segment 117 for separating the segmented local pulmonary vessels into pulmonary arteries and veins by determining a measure for arterialness for each segmented local pulmonary vessel.

Figure 12:
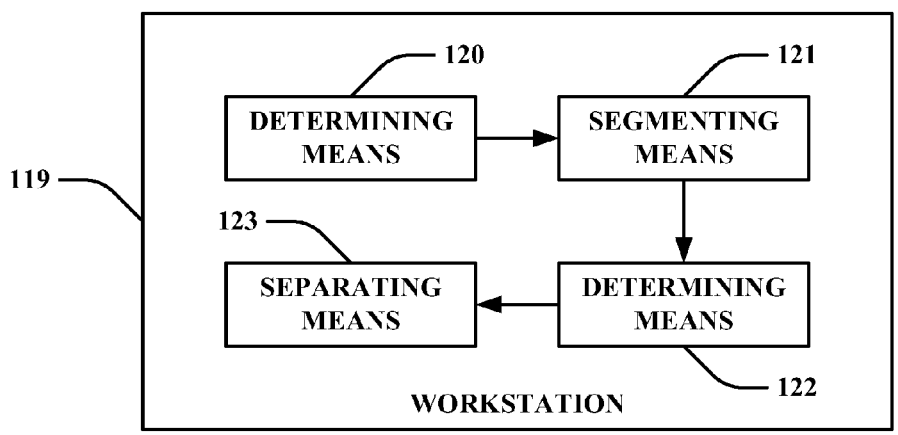
FIG. 12 is a schematic illustration of an exemplary medical workstation according to a further embodiment of the present invention.

FIG. 12 illustrates an exemplary medical workstation according to a further embodiment of the present invention. The medical workstation is arranged for implementing the method of the invention, and configured to receive and process a 3D medical image. Preferably the workstation is arranged to run the above described program code segments in order to perform the method according to the invention. According to the embodiment, the medical workstation 119 is configured for automatic extraction of a pulmonary artery tree from a 3D medical image, and comprises means 120 for determining an orientation of a local bronchus, means 121 for segmenting local pulmonary vessels of the local bronchus into segmented local pulmonary vessels of the local bronchus, means 122 for determining the orientation of the segmented local pulmonary vessels of the local bronchus, and means 123 for separating the segmented local pulmonary vessels into pulmonary arteries and veins by determining a measure for arterialness for each segmented local pulmonary vessel. Said means 120-123 are preferably electronic components operatively connected to each other in a suitable way. Other components of the medical workstation as e.g. display (s) or pointer actuating devices are not illustrated or discussed in detail.

As a conclusion, an automated extraction of a pulmonary vessel tree from a 3D medical image, such as multi-slice CT data, is disclosed. A segmented pulmonary vessel is identified as either an artery or a vein by determining a measure for arterialness for the vessel. The measure is based on a relation of the orientation of a local bronchus to the orientation of the segmented pulmonary vessel of the local bronchus. When a vessel is identified as a pulmonary artery, it is added to the pulmonary artery tree. Radii of the pulmonary artery and bronchus are measured automatically and positions where a ratio of these radii exhibits unusual values are presented in a display, preferably for suggesting further assessment by a radiologist, which for instance is useful for pulmonary embolism detection. An example is given in FIG. 4, where white dots mark such positions in a pulmonary artery tree. FIG. 4 shows also the silhouette of the entire lung lobes surrounding the pulmonary artery displayed. This enables a radiologist or other medical personal to easily find places of interest.

Applications and use of the above described method according are various and include exemplary applications as an option, e.g. a software option, to CT scanner consoles, imaging workstations, or Picture Archive Communication System (PACS) workstations. The method is computationally not demanding and flexible to implement into existing systems.

Application of the present method may be easily detected since results usually are visually displayed. According to an embodiment, for instance, the display shows a combination of the tracheobronchial and the pulmonary artery trees as well as the indications to potentially diseased areas, see e.g. FIG. 10.

The invention can be implemented in any suitable form including hardware, software, firmware or any combination of these. However, preferably, the invention is implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described above with reference to specific embodiments, it is not intended to be limited to the specific form set forth herein. Rather, the invention is limited only by the accompanying claims and, other embodiments than the specific above are equally possible within the scope of these appended claims, e.g. different ways of obtaining the trachea position, seed point for certain algorithms, ways of determining the tracheobronchial tree, than those described above.

It is specifically pointed out that rather than extracting the whole pulmonary vessel tree and judge whether a vessel is artery or vein based on the neighboring bronchi, one could work the opposite way: Extract the bronchial tree and search in the neighborhood of each bronchus for an accompanying vessel which than would be labelled "artery". The veins would not even be extracted at all in this way of working. However, it is pointed out that although such a method seems possible, it is not as optimal as the above described, since bronchial tree extraction is more difficult than vessel extraction and some bronchi might easily be missed. Along with those, the corresponding arteries would be missed as well, which is not desired.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc. do not preclude a plurality. Reference signs in the claims are provided merely as a clarifying example and shall not be construed as limiting the scope of the claims in any way.

The invention claimed is:

1. A method of automatic extraction of a pulmonary artery tree from a 3D medical image, comprising:
   determining, via a processor, an orientation of a local bronchus,
   segmenting, via the processor, local pulmonary vessels of the local bronchus into segmented local pulmonary vessels of the local bronchus,
   determining, via the processor, the orientation of the segmented local pulmonary vessels of the local bronchus,
   separating, via the processor, the segmented local pulmonary vessels into pulmonary arteries and veins by determining a measure for arterialness for each segmented local pulmonary vessel,
   measuring, via the processor, diameters or radii of a bronchi and pulmonary arteries along the pulmonary tree during the segmentation,
   calculating, via the processor, a ratio of the measured diameters or radii of the bronchi and pulmonary arteries, and
   marking, via the processor, positions where the calculated ratio exhibits unusual values in a display.

2. The method according to claim 1, wherein said measure for arterialness of a vessel segment of the segmented local pulmonary vessels is a relation of said orientation of the local bronchus to the orientation of the segmented local pulmonary vessels providing typical values for vessels running close and parallel to the bronchus for identifying such vessels as a local pulmonary artery of the local bronchus.

3. The method according to claim 2, wherein said measure for arterialness of the vessel segment is the absolute value of the dot product of the orientation vectors of a segmented local pulmonary vessel and the nearest local bronchus, this measure providing typical values for a vessel running close and parallel to the nearest local bronchus for identifying that vessel as the pulmonary artery of the local bronchus.

4. The method according to claim 2, wherein said identifying of the local pulmonary artery comprises thresholding a value of said measure for arterialness for deciding whether the vessel segment is included into the arterial tree, wherein an empirically derived threshold is used for said thresholding.

5. The method according to claim 1, further comprising:
   determining the radius of the pulmonary artery, as the radius of the minimal mean derivate of image data computed on a sphere having a radius and being centered at a given centerline point of a pulmonary artery from the segmented local pulmonary vessels.

6. The method according to claim 1, wherein segmenting the local pulmonary vessels of the bronchus is seed-point based.

7. The method according to claim 1, wherein determining the local bronchus orientation is based on a centerline orientation of the bronchus.

8. The method according to claim 1, wherein determining the local bronchus orientation is based on using a local gray-value based measure.

9. The method of claim 1, where marked positions are configured to facilitate suggesting further assessment of said unusual positions by a user.

10. A computer-readable medium having embodied thereon a computer program for automatic extraction of a pulmonary artery tree from a 3D medical image, for processing by a computer, the computer program comprising:
    a code segment for determining an orientation of a local bronchus,
    a code segment segmenting local pulmonary vessels of the local bronchus into segmented local pulmonary vessels of the local bronchus,
    a code segment determining the orientation of the segmented local pulmonary vessels of the local bronchus, and
    a code segment separating the segmented local pulmonary vessels into pulmonary arteries and veins by determining a measure for arterialness for each segmented local pulmonary vessel,
    wherein the measure for arterialness of a vessel segment of the segmented local pulmonary vessels is a relation of said orientation of the local bronchus to the orientation of the segmented local pulmonary vessels providing typical values for vessels running close and parallel to the bronchus for identifying such vessels as a local pulmonary artery of the local bronchus, and
    wherein the measure for arterialness of the vessel segment is the absolute value of the dot product of the orientation vectors of a segmented local pulmonary vessel and the nearest local bronchus, this measure providing typical values for a vessel running close and parallel to the nearest local bronchus for identifying that vessel as the pulmonary artery of the local bronchus.

11. The computer program of claim 10 enabling carrying out of a method of automatic extraction of a pulmonary artery tree from a 3D medical image, comprising:
    determining an orientation of a local bronchus,
    segmenting local pulmonary vessels of the local bronchus into segmented local pulmonary vessels of the local bronchus,
    determining the orientation of the segmented local pulmonary vessels of the local bronchus, and
    separating the segmented local pulmonary vessels into pulmonary arteries and veins by determining a measure for arterialness for each segmented local pulmonary vessel.

12. The computer-readable medium of claim 10, the computer program comprising:
    a code segment determining the radius of the pulmonary artery, as the radius of the minimal mean derivate of image data computed on a sphere having a radius and being centered at a given centerline point of a pulmonary artery from the segmented local pulmonary vessels.

13. The computer-readable medium of claim 10, wherein segmenting the local pulmonary vessels of the bronchus is seed-point based.

14. The computer-readable medium of claim 10, wherein determining the local bronchus orientation is based on a centerline orientation of the bronchus.

15. The computer-readable medium of claim 10, wherein determining the local bronchus orientation is based on using a local gray-value based measure.

16. The computer-readable medium of claim 10, the computer program comprising:
    a code segment for automatically measuring diameters or radii of said bronchi and pulmonary arteries along both pulmonary trees during the segmentation,
    a code segment for automatically calculating a ratio of the measured diameters or radii of the bronchi and arteries, and
    a code segment for automatically marking positions where the calculated ratio exhibits unusual values in a display, for suggesting further assessment of said unusual positions by a user.

17. The computer-readable medium of claim 10, wherein said identifying of the local pulmonary artery comprises thresholding a value of said measure for arterialness for deciding whether the vessel segment is included into the arterial tree, wherein an empirically derived threshold is used for said thresholding.

18. A medical examination apparatus being arranged for implementing the method of claim 1, configured to receive and process a 3D image, wherein said medical examination apparatus is configured for automatic extraction of a pulmonary artery tree from a 3D medical image, comprising:
    means for determining an orientation of a local bronchus,
    means for segmenting local pulmonary vessels of the local bronchus into segmented local pulmonary vessels of the local bronchus,
    means for determining the orientation of the segmented local pulmonary vessels of the local bronchus, and
    means for separating the segmented local pulmonary vessels into pulmonary arteries and veins by determining a measure for arterialness for each segmented local pulmonary vessel,
    wherein the measure for arterialness of a vessel segment is the absolute value of the dot product of the orientation vectors of a segmented local pulmonary vessel and the nearest local bronchus, this measure providing typical values for a vessel running close and parallel to the nearest local bronchus for identifying that vessel as the pulmonary artery of the local bronchus.

19. The apparatus of claim 18, comprising:
    means for automatically measuring diameters or radii of said bronchi and pulmonary arteries along both pulmonary trees during the segmentation,
    means for automatically calculating a ratio of the measured diameters or radii of the bronchi and arteries, and
    means for automatically marking positions where the calculated ratio exhibits unusual values in a display, for suggesting further assessment of said unusual positions by a user.

20. The apparatus of claim 18, wherein said identifying of the local pulmonary artery comprises thresholding a value of said measure for arterialness for deciding whether the vessel segment is included into the arterial tree, wherein an empirically derived threshold is used for said thresholding, wherein the means for segmenting the local pulmonary vessels of the bronchus performs seed-point based segmenting and wherein the means for determining the local bronchus orientation make a determination based, at least in part, on a centerline orientation of the bronchus or on using a local gray-value based measure.

* * * * *